(12) United States Patent
Matsui (10) Patent No.: US 10,463,131 B2
(45) Date of Patent: *Nov. 5, 2019

(54) COSMETIC DEVICES, PRECURSOR THEREFOR AND RELATED METHODS

(71) Applicant: INOAC PACKAGING GROUP, INC., Bardstown, KY (US)

(72) Inventor: Yutaka Matsui, Bardstown, KY (US)

(73) Assignee: INOAC PACKAGING GROUP, INC., Bardstown, KY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/049,867

(22) Filed: Jul. 31, 2018

(65) Prior Publication Data

US 2018/0360192 A1 Dec. 20, 2018

Related U.S. Application Data

(63) Continuation of application No. 14/786,367, filed as application No. PCT/US2014/034951 on Apr. 22, 2014, now Pat. No. 10,051,939.

(60) Provisional application No. 61/836,434, filed on Jun. 18, 2013, provisional application No. 61/816,316, filed on Apr. 26, 2013, provisional application No. (Continued)

(51) Int. Cl.
| | | |
|---|---|---|
| *A45D 34/04* | (2006.01) | |
| *A45D 33/06* | (2006.01) | |
| *B29C 45/00* | (2006.01) | |
| *C08J 9/00* | (2006.01) | |
| *A45D 33/00* | (2006.01) | |
| *A45D 40/26* | (2006.01) | |
| *B29C 45/26* | (2006.01) | |
| *B29C 45/16* | (2006.01) | |
| *B29K 105/16* | (2006.01) | |
| *B29L 9/00* | (2006.01) | |
| *B29L 31/00* | (2006.01) | |
| *B29K 101/12* | (2006.01) | |

(52) U.S. Cl.
CPC .......... *A45D 34/04* (2013.01); *A45D 33/006* (2013.01); *A45D 40/26* (2013.01); *B29C 45/0013* (2013.01); *B29C 45/16* (2013.01); *B29C 45/1657* (2013.01); *C08J 9/00* (2013.01); *A45D 33/008* (2013.01); *A45D 2200/1018* (2013.01); *B29C 2045/1668* (2013.01); *B29C 2045/1693* (2013.01); *B29K 2101/12* (2013.01); *B29K 2105/16* (2013.01); *B29L 2009/00* (2013.01); *B29L 2031/718* (2013.01); *C08J 2300/26* (2013.01)

(58) Field of Classification Search
CPC ...... A45D 34/04; A45D 33/006; A45D 40/26; A45D 33/008; A45D 2200/1018; B29C 45/0013; B29C 45/16; B29C 45/1657; B29C 2045/1668; B29C 2045/1693; C08J 9/00; C08J 2300/26; B29K 2101/12; B29K 2105/16; B29L 2009/00; B29L 2031/718
See application file for complete search history.

(56) References Cited

U.S. PATENT DOCUMENTS

| | | | | |
|---|---|---|---|---|
| 4,859,712 A * | 8/1989 | Cox | ........................ | A61L 27/34 521/62 |
| 6,276,853 B1 * | 8/2001 | Breidenbach | .......... | A45D 34/06 401/17 |
| 6,688,795 B1 * | 2/2004 | Jacob | ..................... | A45D 34/04 401/202 |

* cited by examiner

*Primary Examiner* — David J Walczak
(74) *Attorney, Agent, or Firm* — King & Schickli, PLLC (57) ABSTRACT

A cosmetic device and related methods of manufacturing and using a cosmetic device. The device may comprise a (Continued)

porous part formed using a soluble filler and a non-porous part molded to the porous part.

19 Claims, 6 Drawing Sheets

Related U.S. Application Data

61/814,692, filed on Apr. 22, 2013, provisional application No. 61/847,684, filed on Jul. 18, 2013.

COSMETIC DEVICES, PRECURSOR THEREFOR AND RELATED METHODS

RELATED APPLICATIONS

This application claims the benefit of U.S. National Stage application Ser. No. 14/786,367 filed Oct. 22, 2015, now U.S. Pat. No. 10,051,939, PCT Application PCT/US2014/034951, U.S. Provisional Patent Applications 61/814,692, filed Apr. 22, 2013, 61/816,316, filed Apr. 26, 2013, 61/836,434, filed Jun. 18, 2013, and 61/847,684, filed Jul. 18, 2013, all of which are hereby incorporated by reference herein in their entirety.

FIELD OF THE INVENTION

This disclosure relates to cosmetic devices, such as containers or applicators, precursors therefor, and related methods.

BACKGROUND

Cosmetics are frequently stored and applied as a viscous liquid or as a soft and malleable solid form to an end user. Based on their fluid nature, cosmetics need to be stored in a container that prohibits seeping or leaking until the end user is ready to use them. Similarly, cosmetic containers often also contain a device to assist in applying the cosmetic to the end user. As with the container for containing the cosmetic, it is desirable to have a device to apply the cosmetic that is easy and inexpensive to manufacture with highly reliable results.

SUMMARY

One aspect of the disclosure relates to a cosmetic device, comprising a first part and a second part including a soluble filler and being molded to the first part. The first and second parts may comprise the same material. The first part of the second part may comprise elastomers.

In one embodiment, the first part comprises a handle. The first part may comprise a container for at least partially receiving the second part, or a cap for a container. A lid may be provided for covering the second part in the container and a seal for forming a seal between the lid and the container. The second part may be selected from the group consisting of an insert for being inserted in the second part, a plug for covering an opening of the second part, and a cover for at least partially covering the second part.

In this or another embodiment, the device includes a cosmetic applicator comprising a third part and a fourth part including a soluble filler molded over the third part. In this or another embodiment, an actuator is provided for causing a cosmetic to contact the second part.

In some embodiments, the first part at least partially surrounds the second part. In some embodiments, the first part at least partially surrounds the second part. In one embodiment, the first part comprises a cap including an opening and the second part is positioned over or within the opening of the cap.

The filler may comprise a water-soluble filler. The filler may be adapted to create pores in the range of between about 10~m and about 250~m in diameter. The filler may comprise about 60% to about 85% of the second part. The device may also include a cosmetic.

A further aspect of the disclosure pertains to an apparatus for containing a cosmetic. The apparatus comprises a container including an interior compartment, and an insert positioned in the interior compartment, the insert comprising a porous material and an outer shell molded to the porous material of a cosmetic device. An intermediate layer may extend between the device and the insert. The container may further include an actuator for delivering the cosmetic to the porous material.

The disclosure may also pertain to a precursor for forming a cosmetic applicator. The precursor comprises a first material for forming a sponge comprising a soluble filler and a second material attached to the first material. The second material may be in the form of an object selected from the group consisting of a handle, a container, and a cap for a container. The first material may be in the form of an object selected from the group consisting of an insert for being inserted in the second material, a plug for covering an opening of the second material! and a cover for at least partially covering the second material.

The filler may comprise a water-soluble filler. The filler may be adapted to create pores in the range of between about 10 11 m and about 250 11 m in diameter. The filler comprises about 60% to about 85% of the second part.

The disclosure also pertains to a method of forming a cosmetic device, comprising molding a first material including a soluble filler to second material. The method may further include the step of dissolving the soluble filler to form pores in the first material, such as by using water, with the pores having as diameter in the range of between about 10 um and about 250 um in diameter.

The method may comprise the step of providing a cosmetic in the pores of the first material, and the step of injection molding the second material. The step of injection molding the second material may be done to form a handle, a container, and a cap for a container. The molding step comprises forming the first material as an insert for being inserted in the second material, a plug for covering an opening of the second material, and a cover for at least partially covering the second material.

A further aspect of the disclosure comprises a method of forming a cosmetic device, comprising injection molding a first material to form a solid part, providing a second material including a soluble filler, and molding the second material to the solid part to form the cosmetic device. The method may include the step of dissolving the soluble filler to form pores in the second material, such as by using water, which may create pores in the range of between about 10 um and about 250 um in diameter. The method may further include the step of providing a cosmetic in the pores of the second material. The molding step may comprise placing the solid part in a mold, and placing the second material in the mold over at least a portion of the solid part.

DETAILED DESCRIPTION

Figure 1:
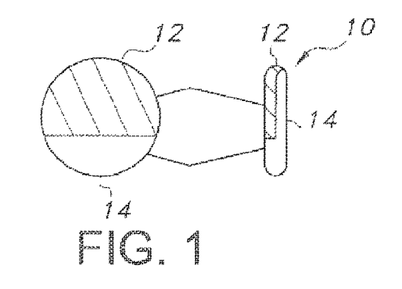
FIG. 1 shows a depiction of a cosmetic device including a porous material attached to a solid, non-porous material.

Reference is made to Figure I, which illustrates one embodiment of a cosmetic device in the form of an applicator 10. The illustrated applicator 10 is comprised of two interconnected parts: a porous part 12 and a base 14, which may be in the form of a non-porous or solid part. The porous part 12 comprises a material having holes and/or pores capable of retaining a liquid or a flowable solid, such as a typical cosmetic. The porous part 12 may serve a device for receiving and retaining such a composition, such as a sponge, or function as an equivalent thereof. The porous part 12 may be made of an elastomer.

The base 14, or non-porous part, is a solid material. The base 14 may optionally be formed of the same base material as the porous part 12, such as an elastomer. The non-porous part or base 14 may be a backing designed to manipulate the porous part 12 by an end user, or may form part of a container for containing the porous materjat as outlined further in the following description. The base 14 may be larger or smaller in surface area or volume than the porous part 12.

The porous part 12 may be attached to the base 14 using a molding process. In one example, the molding process is completed by providing the base 14 in a mold, and then overmolding the porous part 12 to form a unitary structure. This process creates a secure bond between the part 12 and the base 14 without requiring the need for a separate adhesive. The solid part or base 14 may be made using a different process, such as by way of injection molding.

The porous part 12 may not initially be porous (including during the formation process, such as overmolding), but instead be the same material as the solid part with the addition of a soluble filler. Specifically, the porous part 12 may comprise a water-soluble filler that is absent from the solid part. Accordingly, upon contact with water or a water-based solution, the filler dissolves and pores remain, thereby rendering it capable of functioning as a sponge for absorbing or applying the cosmetic without affecting the solid part or base 14.

The filler in the porous part 12 can be dissolved as part of the manufacturing process, or this step may be left to an end user to perform. A water-based cosmetic may also dissolve the filler. Cosmetics may be absorbed into the porous part with the use of applied pressure followed by release and applied to an end user with the use of pressure added to the porous part 12.

The material of the base 14 may be a polymer, such as a synthetic polymer or a natural polymer or a combination thereof. The material used may possess some degree of elasticity in order for the pores of the porous part 12 to be compressed to absorb and dispense the cosmetic. For example, the base material may be an elastomer, such as polyethylene, polypropylene, propylene, styrene-ethylene/butylene-styrene polymers or a thermo polymer, such as a thermoplastic polyester elastomers and thermoplastic vulcanizates.

As can be appreciated, it is possible to vary the pore sizes within the intended porous part 12. As described herein, the pores may be established by introducing one or more water soluble fillers in a material. This may include the same base material as used for the solid part or base 14, followed by overmolding and then later using a water based solution to dissolve the filler.

Both the type of filler or fillers used, as well as the concentrations thereof, will determine the pore size and number. By way of example, water soluble fillers may include a salt. The concentration of the water soluble filler may range from 50% of the solution with the base material to 90% of the solution with the base material. A range of between about 60% to about 85% will provide for a porous part capable of holding a suitable amount of cosmetic without leaking or adversely affecting the integrity of the porous part. By way of example, the filler may comprise 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84% or 85% of the solution with the base material.

The composition of the water-soluble filler can be adjusted such that different pore sizes and ratios of pores can be obtained. The concentration of the filler can also be adjusted. The size of the pores may range between about 10 um and about 250 um in diameter. By way of example, the mean pore size may be 10 um, 15 um, 20 u, 25 um, 30 um, 35 um, 40 um, 45 u, 50 um, 55 um, 60 um, 65 um, 70 um, 75 um, 80 um, 85 um, 90 um, 95 um, 100 um, 105 um, 110 um, 115 um, 120 um, 125 um, 130 um, 135 um, 140 um, 145 um, 150 um, 160 um, 165 um, 170 um, 175 um, 180 1 um, 185 um, 190 um, 195 um, 200 um, 205 um, 210 um, 215 um, 220 um, 225 um, 230 um, 235 um, 240 um, 245 um, or 250 um in diameter.

Figure 2:
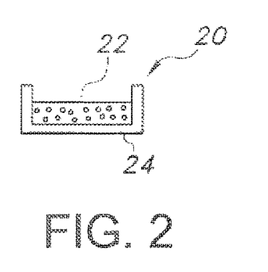
FIG. 2 depicts a cosmetic container including a porous material deposited on a solid base.

The base 14 may provide a means to maneuver the porous part 12, as shown in FIG. 1, or to at least partially receive or contain the porous part. For example, as illustrated in FIG. 2, the solid part or base 14 may be shaped to fit an end user's palm or to be grasped between an end users opposable thumb and finger(s). The solid part or base 14 may be part of a container, such as an insert within a closable container.

In light of the foregoing, and with reference to FIG. 2, another aspect of the disclosure pertains to a cosmetic container 20. The container 20 includes a porous part, which thus forms an insert 22, and a solid part, which includes a base 24. The porous part forming the insert 22 may be overmolded into the base 24 to form the container 20 and may optionally be made of the same material. The container may comprise more than one porous part, such as a porous part for an applicator and a porous part to store/dispense cosmetic.

The insert 22 may further comprise a water-soluble fiber. Consequently, when the insert 22 is contacted with a water based solution, the filler dissolves and pores are accordingly left behind. The type or amount of filler used in the insert 22 may be adjusted in order to manipulate the resulting pore size or frequency.

Figure 3:
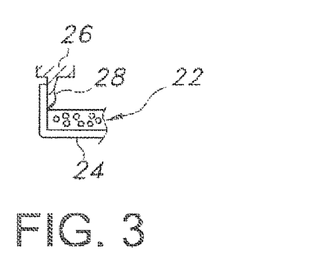
FIG. 3 depicts a portion of a lid forming a seal with a cosmetic device in the form of a container.

As shown in FIG. 3, the container 20 may also provide a means for forming a seal with a lid 26. The means is illustrated as a sealing lip 28 connected to the lid 26 for mating with a sidewall of the base 24. The lip 28 may extend to adjacent the insert 22, and thus contain any liquid material or the like held therein.

The container 20 may optionally also contain a reflector (e.g., a mirrored film) for an end user to utilize in applying a cosmetic. An applicator, such as applicator 10, including a porous part for storing/dispensing cosmetic may also be placed loosely in the container 20 or held in place with the use of an adhesive or a fastener. The applicator 10 may be in contact with the cosmetic to be applied when stored, or may be separated, such as through the use of compartments or hinged dividers.

The porous insert 22 may be fully or only partially porous (for example, the applicator with a solid backing attached described herein may function as a porous insert). The porous insert 22 for storing/dispensing the cosmetic may be surrounded on all sides by the walls of the container 20. The insert 22 may be of equal or less height as the container 20 in order to allow a seal to form between the container and a lid 26. The lid 26 may also be configured so as to provide a seal or a barrier between cosmetic and the lid 26.

Figure 4:
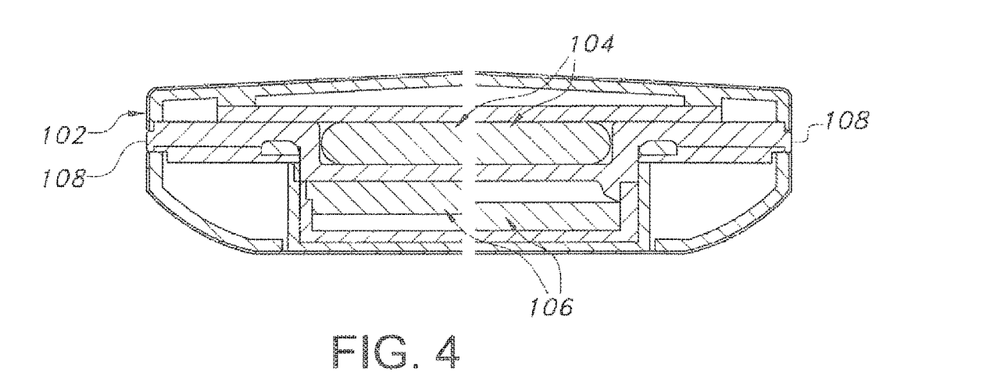
FIG. 4 shows a cross-section of a loose applicator within a cosmetic container with cosmetic separated into a lower compartment.

FIG. 4 depicts another embodiment of a container. In this embodiment, the outside shell 102 is a hard material such as a carbon fiber, and fully encases both the porous applicator 104 and the cosmetic 106. The cosmetic 106 may be loose or contained within a porous material, such as that used for the porous part of the applicator 104. The applicator 104 is separated from the cosmetic 106 by an intermediate layer 108, which may optionally support the porous applicator 104 and seal the cosmetic 106 from leaking.

The porous part as described herein may be used throughout various parts of a cosmetic container. For example, an applicator 104 may comprise a porous part (as in FIG. 4) or may be attached to a solid backing part (as in FIG. 5) and form a part of the container 200, or both (also in FIG. 5). A porous part 204 may also include a cosmetic to assist in storing and/or dispensing the cosmetic, and also a means for providing the porous part 12 with the cosmetic, such as a button 206 (described further herein). Accordingly, a user may utilize one porous part 204 to dispense the cosmetic and another porous part 12 (on applicator 10) to apply the cosmetic. As can be appreciated, providing a separate porous part for applying the cosmetic improves a user's ability to apply the cosmetic accurately.

Figure 5:
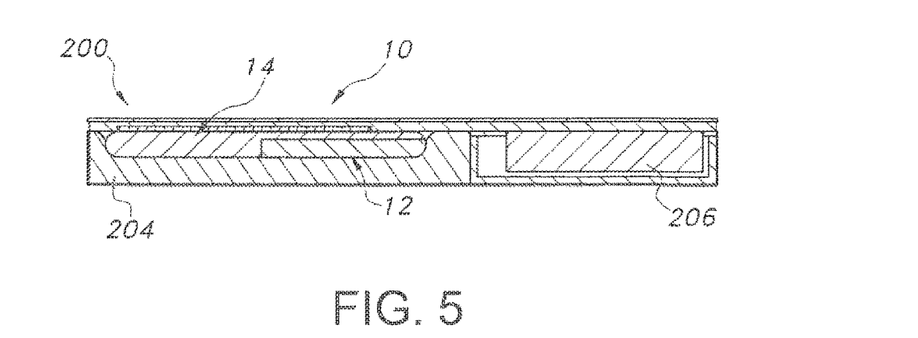
FIG. 5 shows the applicator affixed to a handle and placed within a cosmetics container.
Figure 6:
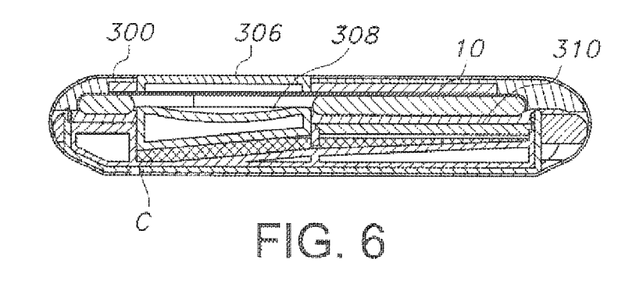
FIGS. 6 and 6A show cross sections of a cosmetic container with different configurations to allow a user to use pressure to load a cosmetic to the porous material.
Figure 6A:
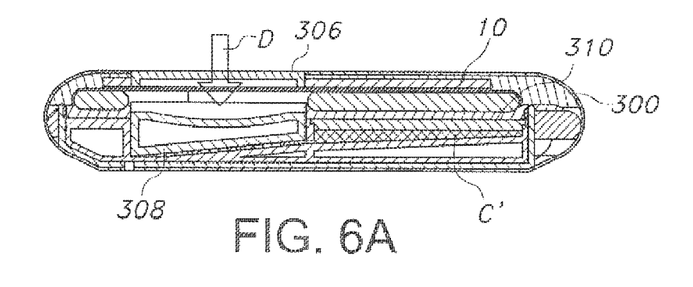
Figure 7:
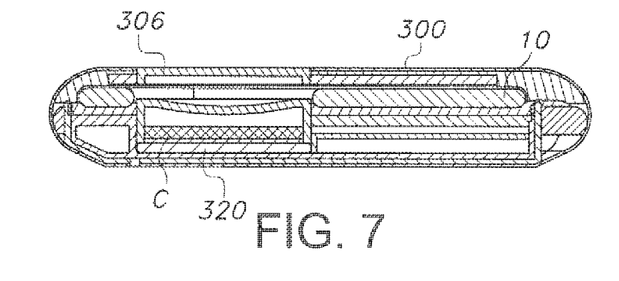
FIGS. 7 and 7A show cross sections of a cosmetic container with different configurations to allow a user to use pressure to load a cosmetic to the porous material.
Figure 7A:
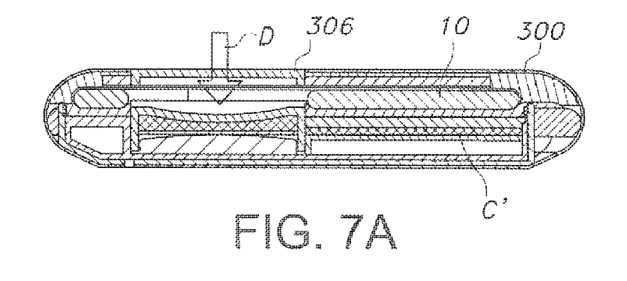
Figure 8:
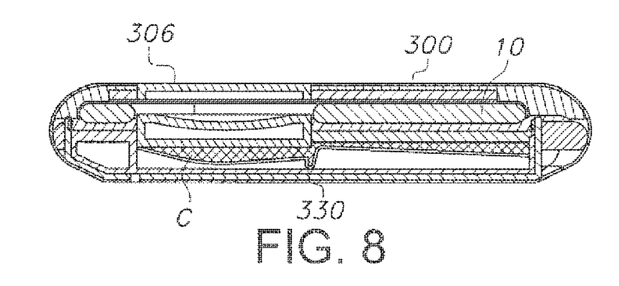
FIGS. 8 and 8A cross sections of a cosmetic container with different configurations to allow a user to use pressure to load cosmetics to the applicator
Figure 8A:
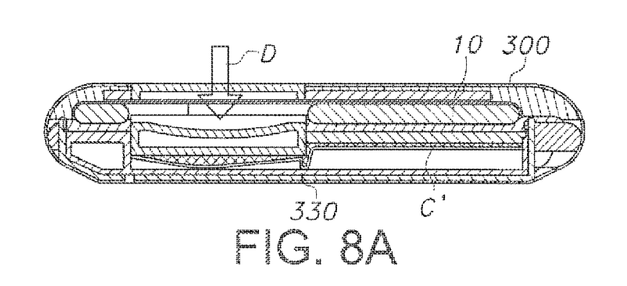

The porous part intended to be used to apply the cosmetic may be isolated from a stored cosmetic (see FIG. 4) or it may be in direct contact with the cosmetic (FIG. 5). As depicted in FIG. 6, a user may apply pressure to the outside of a container 300 to dispense cosmetic from a stored porous part into a porous part 12 of an applicator 10. Specifically, a button 306 may be provided that, upon actuation (note depression arrow D) causes an element 308 in the container to force a cosmetic (compare cosmetic C and cosmetic C' in FIGS. 6 and 6A) to flow into a chamber in contact with a porous part 310, which in turn contacts the porous part 12 of applicator 10. In addition to storing the cosmetic within a porous part, the contact of the cosmetic with an applicator 10 may be controlled through an airbag 320 (FIGS. 7 and 7A) or a pivot 330 (FIGS. 8 and 8A), both of which undergo conformational changes when a user applies pressure to the actuator associated with the container 300. In all cases, the cosmetic may be pushed up into a porous part 310, such as through volume displacement, to aid in dispensing the cosmetic.

Figure 9:
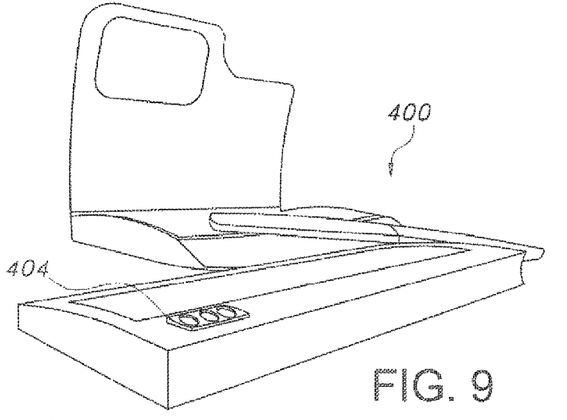
FIGS. 9, 9A and 9B depict using a slide, such as a foundation fin, to shift cosmetic up into a porous part to dispense the cosmetic.
Figure 9A:
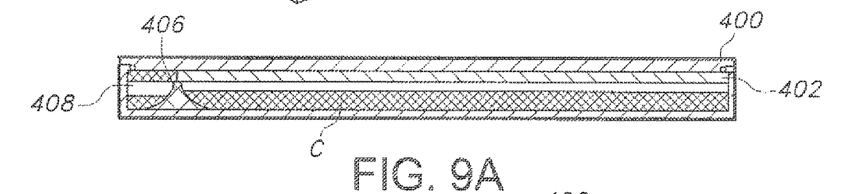
Figure 9B:
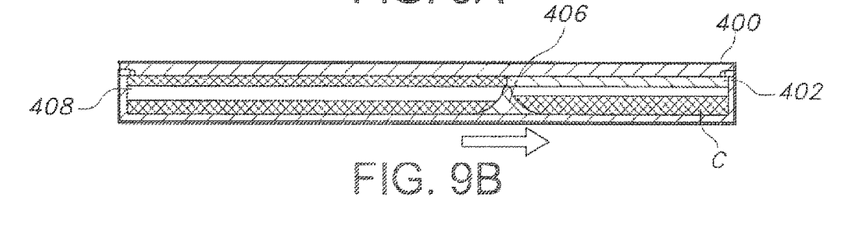

FIGS. 9, 9A, and 9B further illustrate a container 400 including a mechanism for applying a cosmetic C to a porous part 402 therein. The mechanism here includes a slide 404 accessible external to the container 400, and an associated fin 406. Actuation of the slide 404 causes the fin 406 to actuate within a chamber 408 of the container including the cosmetic C and force it into contact with the porous part (compare FIGS. 9A and 9B).

Figure 10:
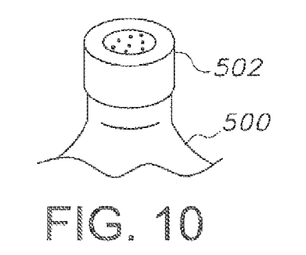
FIGS. 10 and 10A shows the porous material affixed to a non-porous cap at the opening of a liquid container.
Figure 10A:
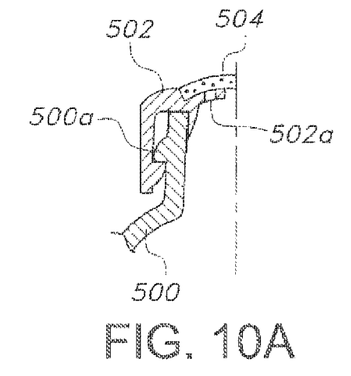

A further aspect of the disclosure pertains to a cosmetic device in the form of a container 500 including a porous dispensing plug or cap 502. A porous part 504 according to this disclosure may cover the opening or a portion of the opening of a liquid container 500. The porous part 504 may be alone or in concert with a non-porous material, such as a rubber plug or a seal to dose the opening. As shown in FIGS. 10 and 10A, the porous dispensing cap 502 may be a cap, such as a threaded cap to screw onto a bottle or affixed to an opening through compression. A further seal may be obtained through the use of compression in a groove 500a of the cap 502, such as an O-ring. The porous part 504 of the cap 502 may be formed by the addition of a water soluble material to a base material, such as by overmolding. The plug or cap 502 can thus become porous by dissolving the soluble filler in the overmolded material, which thus forms the porous part 504.

Figure 11:
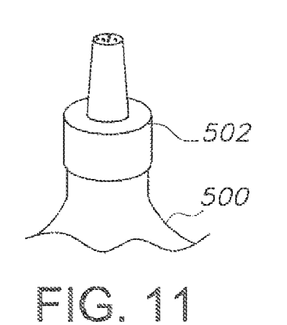
FIGS. 11 and 11A shows the porous material affixed to a non-porous cap at the opening of a liquid container.
Figure 11A:
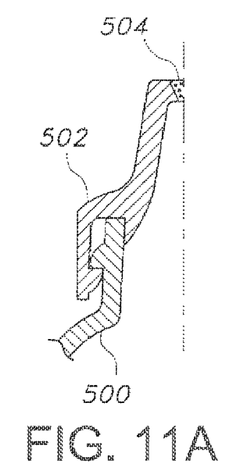

Through the opening of the liquid container 500, and optionally through a narrower hole 502a or holes through the non-porous portion of the plug 502 (see FIG. 10A), the liquid can be absorbed and dispensed by the porous part 504. The porous portion absorbs liquid from the container by gravity or by releasing pressure as liquid is in contact with the porous portion. The liquid is dispensed from the plug 502 by applying pressure to cause it to pass through the porous part 502. As can be appreciated by FIGS. 10 and 11, the plug 502 may take different shapes, and the porous part 502 may be recessed (FIGS. 10 and 10A) or non-recessed (FIGS. 11 and 11A).

The porous material when left alone thus provides a barrier to prevent liquid leaking from the opening. However, when utilized by the end user, such as through applied physical pressure to the porous portions, the porous material can absorb liquid, such as a liqUid cosmetic, for dispensing by the end user. As such, the porous portion provides a means to control dispensing of liquids from containers.

Figure 12:
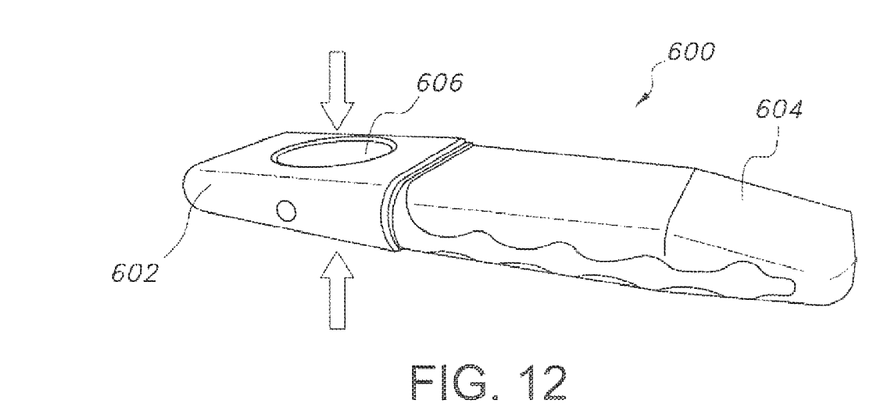
FIGS. 12 and 13 show additional embodiments of a cosmetic device.
Figure 13:
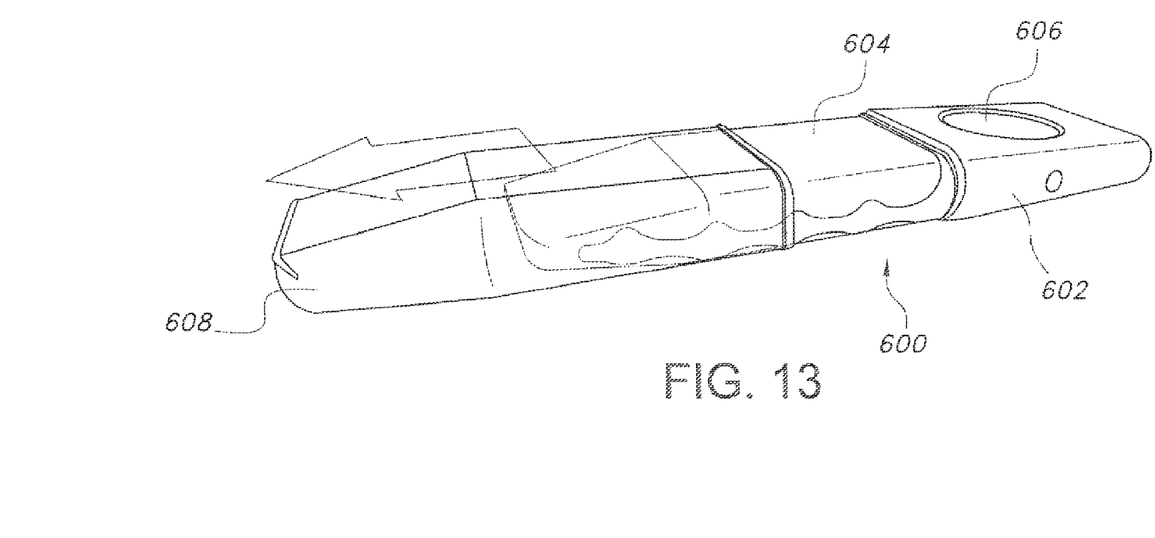

FIGS. 12 and 13 also disclose a further version of a cosmetic device, also in the form of an applicator 600. The applicator 600 includes a non-porous part 602 connected to a porous part 604, such as by using an overmolding technique. The non-porous part 602 may include a chamber (not shown) for holding a cosmetic, and an actuator) such as button 606, may be used to force the cosmetic through a passage (not shown) into contact with the porous part 604. A removable cover 608 may be provided for covering the porous part 604 prior to and after use. As can be appreciated, the non-porous part 602 may form a handle and is thus substantially more rigid than the porous part 604.

Figure 14:
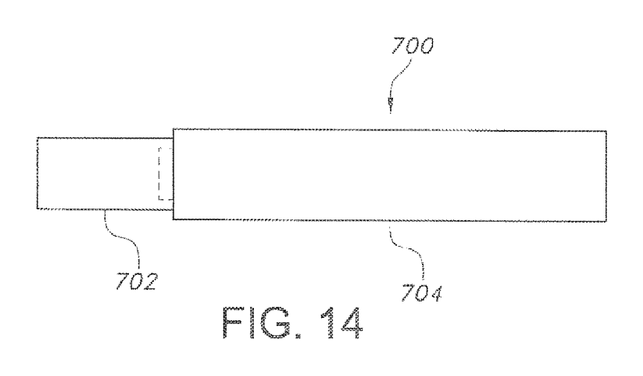
FIGS. 14 and 15 show additional embodiments of a cosmetic device.
Figure 15:
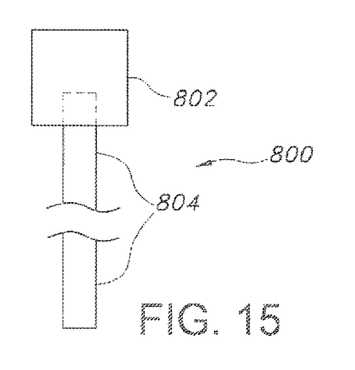

FIGS. 14 and 15 illustrate additional embodiments of cosmetic devices. The device in FIG. 14 is an elongated, pencil-style applicator 700 including a comolded porous part 702 serving as a tip and a non-porous part 704 serving as a base for supporting the tip. The base part 704 may include a compartment (not shown) for supplying the cosmetic to the porous part 702 (thereby creating a container), which the porous part thus serves to cap or plug. A separate cover (not shown) may also be provided as a cover for covering the porous part 702 when not in use.

FIG. 15 illustrates an applicator 800 comprising a comolded porous part 802 forming a tip on a base part 804, which serves as a handle. The porous part 802 thus partially covers the base part 804, and is considered to form a cover. One or both of the porous part 802 or the base part 804 may be provided with surface texturing as desired to enhance the usability.

The present disclosure also relates to methods for making the two part cosmetic devices described herein. The cosmetic applicator may be made by first forming a solid backing part, such as by injection molding. Such molding methods allow the solid part to be molded into any desired shape. The intended porous part can then be overmolded onto the solid part, such as by injection molding. Using the same material for both parts removes the need for adhesives to attach the two. The porous part retains the water soluble fillers at the time of overmolding. The assembled parts can be later contacted with a water based solution to dissolve the filler and leave the resulting pores. For example, thermoformable plastic may be injected with water soluble filler present and then, after cooling} the resulting product may be soaked in water to remove the filler. This approach allows for the formation of a very thin sponge for liquid foundation (see FIGS. 1, 2, and 12-13).

The foregoing descriptions of various embodiments provide illustration of the inventive concepts. The descriptions are not intended to be exhaustive or to limit the disclosed invention to the precise form disclosed. Modifications or variations are also possible in light of the above teachings. The embodiments described above were chosen to provide the best application to thereby enable one of ordinary skill in the art to utilize the inventions in various embodiments and with various modifications as are suited to the particular use contemplated. All such modifications and variations are within the scope of the invention.

The invention claimed is:

1. A cosmetic device, comprising:
    a first part; and
    a second part including a soluble filler and being molded to the first part.

2. The cosmetic device of claim 1, wherein the first and second parts comprise the same material.

3. The cosmetic device of claim 1, wherein the first and second parts comprise elastomers.

4. The cosmetic device of claim 1, wherein the first part comprises a handle.

5. The cosmetic device of claim 1, wherein the first part comprises a container for at least partially receiving the second part.

6. The cosmetic device of claim 5, further including a lid for covering the second part in the container and a seal for forming a seal between the lid and the container.

7. The cosmetic device of claim 1, further including an actuator for causing a cosmetic to contact the second part.

8. The cosmetic device of claim 1, wherein the first part at least partially surrounds the second part.

9. The cosmetic device of claim 1, wherein the second part at least partially surrounds the first part.

10. The cosmetic device of claim 1, wherein the first part comprises a cap including an opening and the second part is positioned over or within the opening of the cap.

11. The cosmetic device of claim 1, wherein no adhesive connects the first part to the second part.

12. The cosmetic device of claim 1, wherein the first part is in the form of a handle, a container, or a cap for a container.

13. The cosmetic device of claim 1, wherein the second part is selected from the group consisting of an insert for being inserted in the first part, a plug for covering an opening of the first part, and a cover for at least partially covering the first part.

14. The cosmetic device of claim 1, wherein the filler comprises a water-soluble filler.

15. The cosmetic device of claim 1, wherein the filler comprises about 60% to about 85% of the second part.

16. The cosmetic device of claim 1, further including a cosmetic.

17. An apparatus for containing a cosmetic, comprising:
    a container including an interior compartment;
    an insert positioned in the interior compartment, the insert comprising a porous material and an outer shell molded to the porous material; and
    the device of claim 1.

18. The apparatus of claim 17, further including an intermediate layer between the device and the insert.

19. The apparatus of claim 17, wherein the container further includes an actuator for delivering the cosmetic to the porous material.

* * * * *